United States Patent [19]

Kile

[11] 3,864,363
[45] Feb. 4, 1975

[54] FURAN PURIFICATION
[75] Inventor: Glenn F. Kile, Borger, Tex.
[73] Assignee: Phillips Petroleum Company, Bartlesville, Okla.
[22] Filed: July 10, 1973
[21] Appl. No.: 377,990

[52] U.S. Cl. ........ 260/346.1 R, 423/622, 260/680 E
[51] Int. Cl. .............................................. C07d 5/14
[58] Field of Search ............... 260/346.1 R; 423/622

[56] References Cited
UNITED STATES PATENTS
3,692,859  9/1972  Cottle .......................... 260/346.1 R Primary Examiner—Norma S. Milestone
Assistant Examiner—Bernard I. Dentz

[57] ABSTRACT

The life of base treated zinc oxides is substantially extended by activating same by contacting with untreated, but relatively dry, furan for an extended period of time while gradually increasing the temperature and pressure until normal operating conditions are reaached, at which time the activated base treated zinc oxide can be placed into purification service for removing deleterious contaminants including sulfur compounds from furan concentrates.

10 Claims, No Drawings

FURAN PURIFICATION

This invention relates to the purification of furan-containing streams. In accordance with another aspect, this invention relates to the purification of a furan concentrate obtained as part of an effluent from an oxidative dehydrogenation process. In accordance with another aspect, this invention relates to rendering innocuous deleterious contaminants including sulfur compounds present in furan concentrates by contacting with base treated zinc oxide which has been pretreated with dry furan. In accordance with a further aspect, this invention relates to a startup procedure for the purification of furan concentrates containing deleterious contaminants by contacting with caustic treated zinc oxide wherein, prior to purification service, the caustic treated zinc oxide is activated by contacting with untreated, dry furan for a period of time sufficient to dry the caustic treated zinc oxide and reach normal operating purification conditions at which time the dried caustic treated zinc oxide can be placed in purification service. In accordance with a further aspect, this invention relates to a regeneration procedure for revivifying spent caustic treated zinc oxide by steaming same followed by an activation treatment with relatively dry furan and then placed into purification service.

In the production of butadiene by the process of oxydehydrogenation, furan is a by-product. Purification of this by-product stream to produce furan that is commercially acceptable involves a difficult problem which is also encountered in the purification of furan prepared by other reaction processes. Commercially useful furan is generally required to have a low sulfur content, usually in the range of 15 parts per million or below. It is known that zinc oxide is an effective material for selectively removing sulfur contaminants as well as other deleterious materials from various streams. It is also known that base treated zinc oxide such as caustic treated zinc oxide is more effective in that increased life of the zinc oxide is realized for the purification of sulfur-containing furan streams. It has now been found that the life of the zinc oxide can be further extended when it is treated with a base by pretreating or activating the base treated zinc oxide with relatively dry, untreated furan prior to its use in the purification of contaminated furan streams.

Accordingly, an object of this invention is to provide a process for the removal of deleterious contaminants including sulfur compounds from furan concentrates.

A further object of this invention is to provide a startup procedure for the activation of zinc oxide adsorbents.

Another object of this invention is to provide a process whereby the life of a purification adsorbent material is considerably extended.

Other objects and aspects, as well as the several advantages of the invention, will be apparent to those skilled in the art upon reading the specification and the appended claims.

In accordance with the invention, it has been found that the effectiveness and the life expectancy of base treated zinc oxides can be substantially improved for the purification of furan-containing streams if the base treated zinc oxide is activated under controlled conditions by contacting same with untreated, but relatively dry, furan for an extended period of time sufficient to activate the zinc oxide.

More specifically in accordance with one embodiment of the invention, a startup procedure is provided for the activation of base treated zinc oxides prior to use wherein the base treated zinc oxide is activated by initially contacting with dry furan, preferably an untreated crude furan, at ambient conditions and continuing the contacting while gradually increasing the temperature and pressure of the contacting until the base treated zinc oxide is dried and normal operating purification conditions are reached, and then placing the thus-activated base treated zinc oxide into purification service by contacting with contaminated furan-containing streams to remove and/or render innocuous contaminants present therein.

Further in accordance with the invention, it has been found that spent base treated zinc oxides which have been used for the purification of contaminated furan-containing streams can be readily regenerated by steaming, preferably with superheated steam, to remove the contaminants therefrom, and then activating same as set forth above before returning to purification service.

The pretreatment or activation process of this invention is applicable to freshly prepared zinc oxides that have been treated with a base material, such as caustic, or following steam regeneration of a base treated zinc oxide that has been in purification service for some time. The activation can be carried out with dry, crude untreated furan or with dry, desulfurized furan which can be recycled from the purification process effluent. From an economical standpoint, dry crude furan is preferred. The dry furan can be prepared by subjecting a furan fraction to distillation to remove most of the moisture present. Generally, the untreated, but relatively dry, furan used according to the invention will contain less than about 50 ppm moisture.

In accordance with the invention it has been found that the life of a bed of sodium hydroxide solution treated zinc oxide can be substantially increased if activated by first purging the system with an inert gas and then passing cool, dry liquid furan over the bed while slowly heating, vaporizing and superheating the furan until normal initial operating conditions of about 100 psig and about 400° F are reached and, at the same time, making certain that the effluent from the pretreatment is dry before contaminated furan to be treated is passed through the bed. In actual operation, the life of base treated zinc oxides is substantially extended by activating same by contacting with untreated, but relatively dry, furan for an extended period of time while gradually increasing the temperature and pressure until normal purification operating conditions are reached, at which time the treated material is sent to finished product storage provided the sulfur content of the exit furan meets specification. If the product does not meet sulfur specification, the inlet temperature of the product is raised to a maximum of 600° F and the contacting continued until the furan meets specification.

It has also been found that the regenerative steaming of the bed when followed by the same purging and drying steps likewise increases the life of the bed after regeneration for further purification service.

The base treated zinc oxide, whether freshly treated with a base or steam regenerated base treated zinc oxide, can be any suitable zinc oxide, either natural or synthetic, having a zinc oxide content ordinarily greater than about 50 weight percent, with the remainder being an inert binder such as a silicon-containing material. Other inert materials can be employed if desired. The effectiveness of the zinc oxide adsorbent is improved by treatment with a base such as sodium hydroxide, sodium carbonate, and the like, prior to activation by contacting with dry furan, followed by contacting with a contaminated furan concentrate. The amount of base added can be in the range of 0.01 to 10 weight percent although for practical reasons the amount often used will be about 0.5-1 weight percent. Other basic materials that can be employed include alkaline earth hydroxides such as calcium hydroxide and the other alkali metal carbonates, and hydroxides including the potassium derivatives.

In accordance with the invention, the base treated zinc oxide is pretreated before being placed into adsorption service by initially contacting same with relatively dry furan at ambient conditions and continuing the contacting with dry furan while gradually increasing the temperature and pressure until adsorption operating conditions are reached and the base treated zinc oxide is dry, and then placing the base treated zinc oxide into adsorption service. The dry furan can be specifically prepared furan having a low moisture content of less than about 50 ppm or it can be recycled furan product following adsorption, which is low in moisture and essentially free of other materials. Crude untreated furan is preferred. The period of contacting is sufficient to dry the base treated zinc oxide and heat the bed to a temperature of about 400° F, but not more than about 600° F, which are the normal operating temperatures for adsorption service for removing contaminants from furan concentrates.

As indicated above, it is preferred to purge the adsorption system before activation with an inert gas such as nitrogen, sweet natural gas ($H_2S$ has been removed), and the like. This is true also after steam regeneration. The purging removes oxygen and oxygen-containing compounds from the system.

Although the invention has so far been described primarily utilizing one adsorbent bed zone, it should be understood by those skilled in the art that any number of beds desired can be advantageously employed. In a specific operation, two adsorption zones are employed, one being in adsorption service while the other is being regenerated and dried and activated by contact with dry furan prior to placing the bed in adsorption service.

The furan concentrates contaminated with various impurities including moisture and sulfur compound to be purified according to the invention can be obtained from any source. The present invention has been employed successfully in purifying contaminated furan concentrates containing moisture and sulfur impurities obtained as a by-product from an oxidative dehydrogenation process wherein the hydrocarbon is converted to at least one less saturated product.

The furan concentrates obtained from oxidative dehydrogenation processes as a by-product stream can be narrow or broad in boiling range, but ordinarily contain a significant amount of furan, say, at least five weight percent. The concentrate is ordinarily relatively free of lighter boiling materials such as butenes or butadiene. This is an economic rather than a technical preference.

In practice, the furan concentrates can be obtained by consecutively subjecting the oxidative dehydrogenation effluent to removal of water and water solubles such as by an aqueous quenching step, removal of light gases such as absorption-stripping step, and removal of principal dehydrogenation products by a fractionation step. The remaining furan-containing fraction containing sulfur contaminants as well as other impurities is then subjected to purification by contacting with a base treated zinc oxide prepared according to the present invention.

The absorption step of the present invention for the purification of furan concentrates comprises contacting of a furan concentrate with a base treated zinc oxide activated as defined above at temperatures in the range of from about 400° to about 600° F and at any convenient pressure such as, for example, atmospheric to about 250 psig, or higher depending upon equipment limitations and other considerations. The purification contacting is carried out in the vapor phase and at rates which will vary with the nature of the specific furan concentrate being treated. Ordinarily the liquid hourly space rates will vary appreciably depending upon the composition of the furan concentrate being treated and will be in the range of from about 0.1 to about 10 LHSV. It has been found through plant experience that best results have been obtained at higher space velocities in the range of 5-8 LHSV. In general, the treatment will be sufficient to substantially reduce the total sulfur content of the furan concentrate.

The invention can be carried out in a continuous, semi-continuous or batch operation. As indicated above, continuous operation employing plural beds of base treated zinc oxide is preferred. Any convenient mode of contacting can be used although fixed bed operation is presently preferred.

As indicated previously, spent base treated zinc oxide can be regenerated by steaming for a period of time sufficient to remove from the base treated zinc oxide adsorbed contaminant. Ordinarily, superheated steam of approximately 600° F is employed. The length of time for steaming will ordinarily range from, say, 1 hour to 8 or 10 hours. It has been found that maximum bed life can be achieved by steaming about 8 hours or more. If desired, saturated steam can be used, but this will ordinarily leave more water on the base treated zinc oxide which then requires longer pretreatment and activation time with dry furan to prepare the adsorbent for adsorption service.

The following example, part of which is based upon actual plant data and part is calculated from the actual data, illustrates the effectiveness of the invention for extending the adsorption life of caustic treated zinc oxide.

EXAMPLE

A treated zinc oxide catalyst bed is prepared in the following manner. The old bed of zinc oxide is dumped and the reactor filled with fresh zinc oxide. For each 25 cubic feet of catalyst added to the reactor, 5 gallons of 20% sodium hydroxide caustic solution is manually sprinkled over the catalyst. The reactor is then closed and purged with sweet residue gas ($H_2S$ removed) at the rate of about 500 cubic feet per minute for an hour.

Cool, dry crude product furan is then pumped through the bed at a rate of 100 gallons per hour for about an hour. This furan is recycled to the crude furan purification feed tank and has free water in it. The furan feed is then gradually heated until vaporized and superheated to 400° F and is permitted to pass through the bed until the outlet temperature begins to rise and the dryness is determined by test. This normally takes 1½ to 2 hours.

The effluent is monitored for sulfur content and the inlet temperature adjusted as required to regulate the activity of the catalyst. When the product is satisfactory, recycling of the condensed material to the crude feed to the furan purification system is discontinued and the product is sent to furan sales. Use of the bed is continued with the inlet temperature gradually being increased as required for the furan to meet the sulfur specification until a maximum of 600° F is reached after which no further temperature increase is made due to the lack of stability of the furan above that point. The pressures used vary from a minimum of 100 psig to a maximum of 250 psig as set by existing equipment. As sulfur is removed by the bed the pressure drop required to move the furan increases, and more pressure is needed. In actual operation the preferred range is 100–150 psig.

When the bed can no longer produce furan meeting the minimum specification, the vent is opened to the the atmosphere and a 1-inch valve opened wide admits approximately 1,000 lb/hr of steam to the bed which is steamed for 8 hours, after which the bed is cooled and purged with sweet residue gas ($H_2S$ removed) until near ambient temperatures are reached after which the drying step described before is repeated and the bed placed on line. According to one extended evaluation, it has been found that the activation of a caustic treated zinc oxide bed as is described above will normally extend its life from 20 to 27 days for an increase of approximately 33⅓%. The regeneration of a used catalytic bed by steaming and drying has likewise been found to extend the bed's life to 34 days for an increase of approximately 25%. However, it should be recognized that greater and lesser improvements have been realized depending upon the sulfur content of the furan concentrate.

In actual plant operations, wide swings in sulfur content of the furan to the zinc oxide treatment beds of 60 to 500 ppm sulfur were observed with the normal variation ranging from 150 to 300 ppm sulfur. This variation comes from several sources within the production unit such as upsets in the plant boiler system putting solids in the steam to the oxydehydrogenation of butane step in the feed unit resulting in increased sulfur, or the periodic receipt during the week of recycle streams from other facilities to the production unit which contain sulfur. This variation in feed has caused the plant to go from a single 25 cubit foot zinc oxide bed reactor to a 25 cubic foot zinc oxide bed reactor followed in series flow with a 50 cubic foot reactor so as to produce a more uniform specification product.

In actual plant operations, steam regeneration is made with superheated steam of approximately 600° F and at 10 psig. Steaming takes an 8-hour shift. A shorter time of 4 hours was tried, but less effective regeneration resulted. Regeneration was also made with 300 psig saturated steam having a temperature of approximately 420° F, but this left more water in the zinc oxide. Any type steam would work but the lower the temperature the more water that will remain on the zinc oxide. It would appear in the latter instance that flushing the saturated steam through a valve would superheat it.

I claim:

1. A method for pretreating a bed of base treated zinc oxide before said bed is placed into adsorption service to selectively adsorb contaminants from a furan-containing stream which comprises cycling a fluid stream of dry furan through said bed of adsorbent while gradually increasing the temperature and pressure of said fluid stream until said bed of adsorbent is dry, and then placing said bed into adsorption service.

2. A method according to claim 1 wherein said adsorbent bed is freshly prepared caustic treated zinc oxide.

3. A method according to claim 1 wherein said adsorbent bed is steam regenerated caustic treated zinc oxide.

4. In a regenerative process for purifying a furan stream containing sulfur impurities by contacting with a base treated zinc oxide, the process is started up by
   a. drying the zinc oxide after treatment with a base by initially activating same by contacting with a dry furan stream at ambient conditions,
   b. continuing said contacting while gradually increasing the temperature and pressure of said dry furan while passing same over the zinc oxide from ambient conditions to the normal operating purification conditions of temperature and pressure and until said base treated zinc oxide is dried,
   c. then switching said dried bed to purification by contacting same with a furan concentrate containing deleterious contaminants including sulfur compounds under conditions of temperature and pressure and for a period of time sufficient to substantially remove said contaminants or render same innocuous, and
   d. recovering a furan concentrate substantially freed of deleterious contaminants.

5. A process according to claim 4 wherein the normal operating condition for step (b) is a temperature of at least about 400° F and a pressure of at least about 100 psig.

6. A process according to claim 4 wherein said zinc oxide is treated with caustic and the caustic treated zinc oxide is purged with an inert gas prior to drying in step (a) to remove oxygen and oxygen-containing material from the system.

7. A process according to claim 4 further comprising:
   e. regenerating spent base treated zinc oxide by contacting with steam for a period of time sufficient to substantially remove adsorbed impurities from the base treated zinc oxide and
   f. repeating steps (a), (b) and (c).

8. A process according to claim 7 wherein the steam used in step (d) is superheated and adsorbent is caustic treated zinc oxide.

9. A process according to claim 4 wherein step (a) is carried out by initially contacting with cold, liquid, dried desulfurized furan and the vaporized contaminated furan contacting in step (c) is carried out at a temperature in the range of 400°–600° F and a pressure of 100-250 psig.

10. A process according to claim 4 wherein there are a plurality of beds of base treated zinc oxide in separate zones and the process is carried out in a continuous manner in that at least one zone is being subjected to startup as set forth in steps (a) and (b), at least one zone is in adsorption service as set forth in step (c), and at least one zone is being subjected to steam regeneration to rejuvenate spent caustic treated zinc oxide.

* * * * *